June 8, 1954

W. SHEPARD, JR., ET AL 2,680,669

CATHODE RAY MULTISIGNAL MEASURING
AND RECORDING APPARATUS

Filed Nov. 26, 1947

Inventors
W. Shepard, Jr.
M. A. Serrell
G. L. Beyer, Jr.
A. F. Robertson

By M. A. Hayes

Attorney

W. SHEPARD, JR., ET AL 2,680,669

CATHODE RAY MULTISIGNAL MEASURING
AND RECORDING APPARATUS

Filed Nov. 26, 1947

Inventors
W. Shepard, Jr.
M. A. Serrell
G. L. Beyer, Jr.
A. F. Robertson

By M. C. Hayes

Attorney

UNITED STATES PATENT OFFICE 2,680,669

CATHODE RAY MULTISIGNAL MEASURING AND RECORDING APPARATUS

Ward Shepard, Jr., Washington, D. C., Morton A. Serrell, Wynnewood, Pa., George L. Beyer, Jr., Washington, D. C., and Alexander F. Robertson, Charlottesville, Va.

Application November 26, 1947, Serial No. 788,307

6 Claims. (Cl. 346—110)

(Granted under Title 35, U. S. Code (1952), sec. 266)

This invention relates to cathode ray multisignal apparatus for measuring and recording simultaneous variations in a plurality of signals respectively corresponding to variations in a plurality of quantities. More specifically, the invention relates to means for producing six traces simultaneously on a moving film and corresponding to signals caused by variations in quantities to be measured and projected on recording film in a transverse line with respect thereto by a plurality of cathode ray tubes while the film is moving at a continuous rate of travel, an optical system being employed to direct images of the moving spots on the fluorescent screens of the tubes onto the film.

In accordance with a preferred embodiment of the invention, a plurality of cathode ray tubes are preferably disposed in a row with their fluorescent screens preferably arranged in the same plane; individual amplifiers are associated with the cathode ray tubes whereby the signals control the deflections of the beams in the same plane, for example, the horizontal plane. A lens and mirror system focuses images of the indications on the screens into adjacent spaced positions on a moving film. Means are provided to move the film past the lens in the focal plane thereof at a uniform rate, thereby to provide continuous displacement time records of the spots on the screens of the cathode ray tubes and two-dimensional traces on the film for the respective indications. Calibrating circuits are provided for the amplifiers, and switching means controlled from the film moving means is provided for deflecting the beams off the fluorescent screens except when useful signals are being applied to the amplifiers.

In accordance with a preferred form of the invention six cathode ray tubes are provided for simultaneously producing six signal traces on the film, and in addition thereto, two other cathode ray tubes are provided for applying timing traces to the film, these two cathode ray tubes also having deflection amplifiers associated therewith. Means of conventional design is provided for supplying timed pulses to the deflection amplifiers of the cathode ray tubes which supply the timing traces. Additional supplemental circuits are preferably provided, for example, beam control and signal initiation switching circuits to conserve the fluorescent material on the screens of the tubes. A system of mirrors is provided for viewing the cathode ray screens, the system including a rotatable mirror adapted when rotated to provide two-dimensional images of the spots on the fluorescent screens.

The equipment embodying the subject invention is particularly constructed and arranged to provide portability and economy of size and weight. Special circuits in the amplifiers provide maximum sensitivity and stability with a minimum of component parts. A mirror and lens system permits mounting the oscilloscopes and camera in a compact arrangement. An adjustable timing device operatively connected to the camera controls the amplifiers and oscilloscope circuits in a manner to provide maximum efficiency of operation and longevity of the fluorescent screens of the cathode ray tubes. A portable and compact power supply provides all necessary operating voltages for the tubes, and is suitable for use with commercially available power sources.

One of the objects of the invention is to provide new and improved means for simultaneously producing visual indications respectively corresponding to variations in a plurality of signals respectively corresponding to changes in a plurality of variable quantities.

Another object is to provide new and improved apparatus including a plurality of cathode ray oscilloscopes for simultaneously securing measurements of a number of varying signals.

Another object of the invention is to provide new and improved measuring and recording apparatus employing a plurality of cathode ray tubes and having an automatic beam control circuit for centering the beams of the tubes on the fluorescent screens thereof as the signals to be recorded are applied to the deflection plates, and thereafter decentering the beams when a predetermined period of time has elapsed, thereby to minimize wear of the fluorescent material of the screens.

Another object is to provide new and improved means for calibrating the amplifier channels of a multiple trace cathode ray oscilloscope whereby the scale sensitivity of the screens and the gains of the amplifiers may be readily determined by inspection of the screens.

Another object resides in the provision of new and improved automatic timing circuits for use with an oscilloscope for controlling the initiation of the signals to be visually reproduced.

Another object is to provide a new and improved timing device for use with a recording cathode ray oscilloscope employing moving film, in which the timing device is automatically controlled by the same means which moves the film.

Another object resides in the provision of a new and improved deflection control amplifier characterized by high sensitivity and fidelity with a minimum of parts, and particularly adapted for use in a portable cathode ray oscilloscope.

A further object is to provide new and improved apparatus for visually observing the indications appearing simultaneously on a plurality of cathode ray tubes.

A still further object resides in the provision of new and improved camera apparatus and optical system therefor for recording as two dimensional traces a plurality of spot indications of moving cathode ray tube beams, in which the movement of the camera film provides a time base for the indications.

Still other objects, advantages, and improvements not specifically set forth hereinbefore will be apparent after a consideration of the following specification taken in conjuntion with the accompanying drawings, in which.

Figure 1:
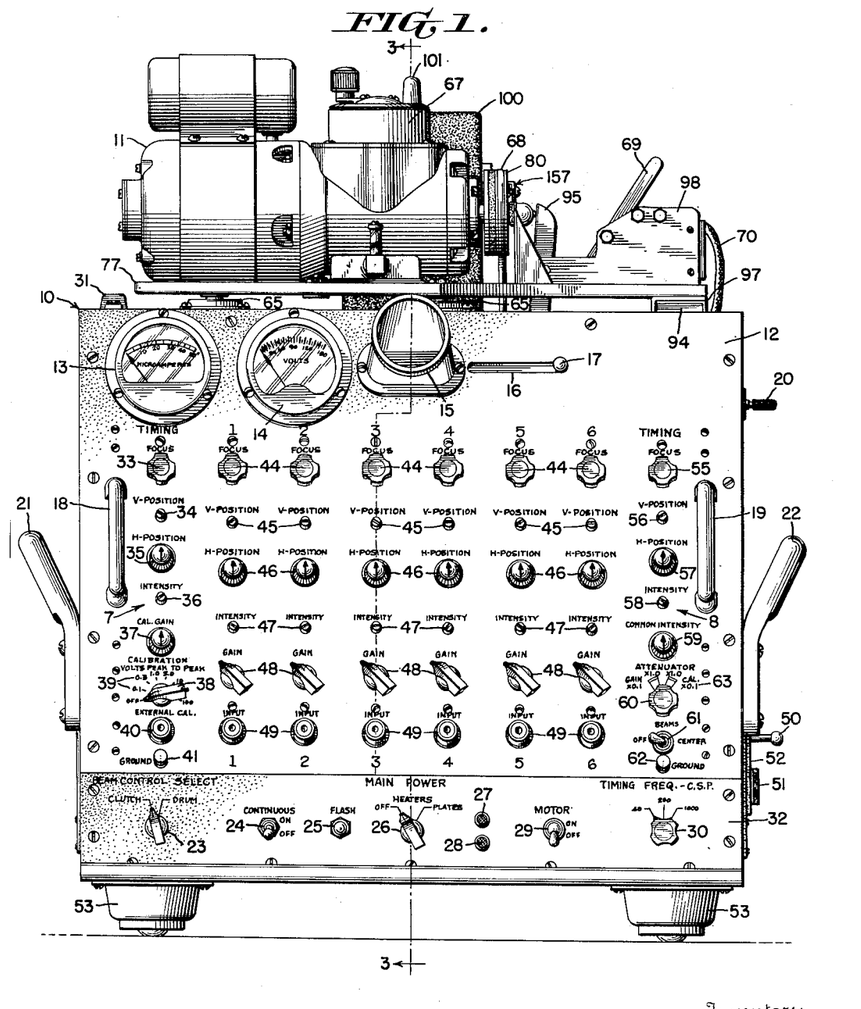
Fig. 1 is a front view in elevation of a suitable housing for the apparatus of the preferred embodiment of the invention.

Referring now to the drawings and more particularly to Fig. 1 thereof, there is shown a cabinet or housing generally designated by the reference numeral 10, mounted on four shock absorbing supports of conventional design, which are shown at 53. Upon the sides of the housing 10 are mounted handles 21 and 22 to facilitate movement of the equipment, one of the objects of the invention being to provide portable multiple trace cathode ray measuring and recording equipment. Mounted upon the framework of housing 10, preferably sloping to somewhat facilitate ease of operation of the controls thereon and maximum visibility of the instruments, is a main panel 12, and below that a somewhat narrow switching panel 32, the panels being held in position on the main framework by suitable screws or other means. Panel 12 has handles 18 and 19 fixed thereon to facilitate removal thereof from the housing 10.

Inside the housing 10, and fixed to the back of panel 12 by any suitable means, is a row of eight chassis, Fig. 7, 7C, 1C, 2C, 3C, 4C, 5C, 6C, and 8C for corresponding channels or circuits 7, 1, 2, 3, 4, 5, 6, and 8 respectively comprising eight cathode ray tubes 7T, 1T, 2T, 3T, 4T, 5T, 6T, and 8T respectively and amplifiers therefor. These chassis are detachably mounted upon the panel 12, and each chassis is precisely located in a predetermined vertical position thereon by two keys or guide feet, shown on the left of the chassis 3C, Fig. 3, and which may, if desired, fit into two shallow grooves, not shown, extending longitudinally across the rear side of front panel 12. The two end cathode ray tubes and amplifiers are provided for timing purposes, as will be hereinafter more fully elaborated. The six inner cathode ray tubes and amplifiers are provided to supply simultaneous measurements or indications of variations in six signals corresponding to variations in six quantities, as will be hereinafter more fully explained. The controls for the eight amplifiers are included among the controls adjustable from the front of panel 12.

Two meters are provided, mounted in the upper left hand corner of the panel, Fig. 1, meter 13 serving as the indicating device of a vacuum tube voltmeter circuit included in the apparatus of channel or circuit 7, meter 14 being an A.-C. voltmeter of conventional design for indicating the voltage of the A.-C. power lines supplying power for the equipment, in the embodiment shown 110 v., A. C., 60 cycles.

Figure 7:
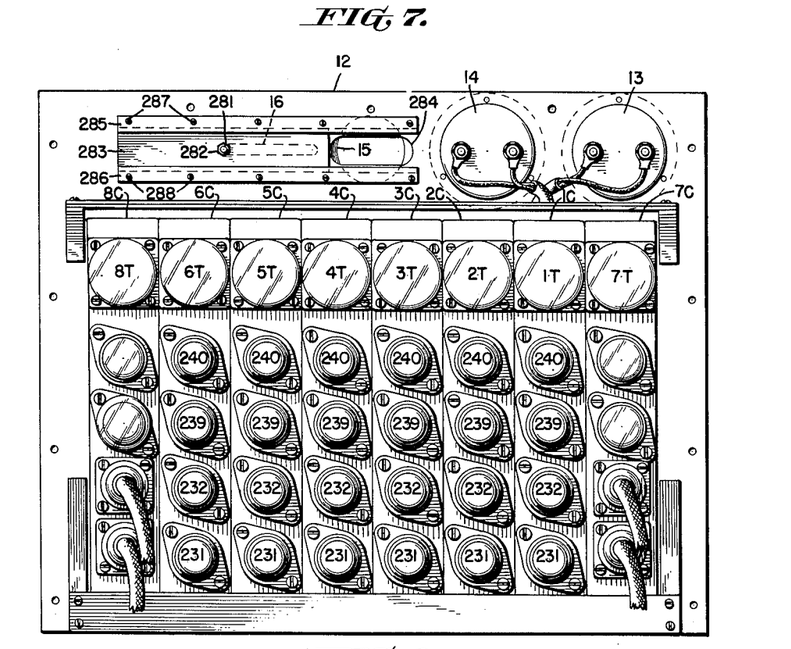
Fig. 7 is an elevational view of the back of the front panel, showing the arrangement thereon of the chassis of the cathode ray tubes and amplifiers.

The circuit of channel 7 for cathode ray tube 7T, Fig. 7, may be of conventional design. Knob 33 mounted on the front of panel 12, Fig. 1, controls the focus of the beam of tube 7T, in any conventional manner well known to those skilled in the art to which the invention pertains, as by controlling the arm of a potentiometer connected in the cathode ray tube circuit. Shaft or set screw 34 controls the vertical centering of the electron beam of tube 7T by conventional means, as by controlling the arm of a potentiometer connected in the cathode ray tube or amplifier circuit. Knob 35 controls the horizontal centering of the electron beam of tube 7T, as by controlling the position of the arm of a potentiometer in the amplifier or cathode ray tube circuit, in a manner well known to those skilled in the art. Shaft or set screw 36 controls the beam intensity, as by controlling the arm of a potentiometer in the cathode ray tube circuit, as is well known to those skilled in the art.

Figure 3:
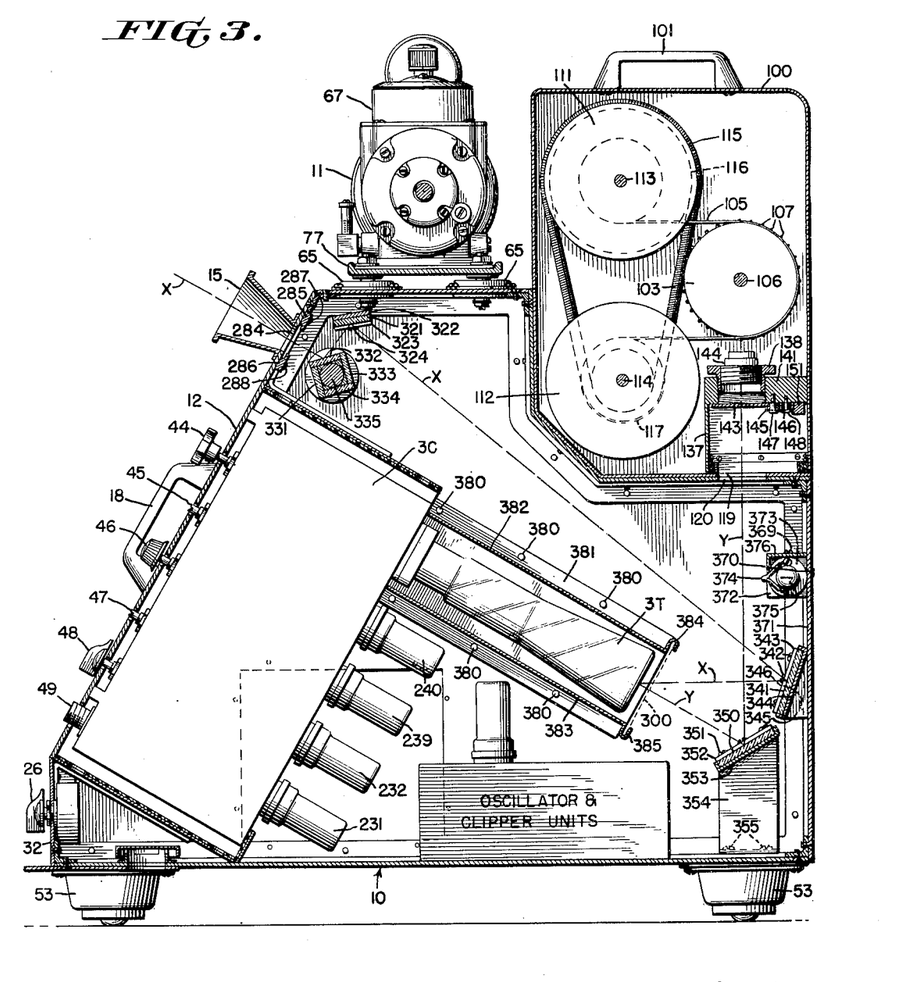
Fig. 3 is a vertical section through the housing and camera along the line 3—3 of Fig. 1, showing the general arrangement of the parts within.
Figure 10:
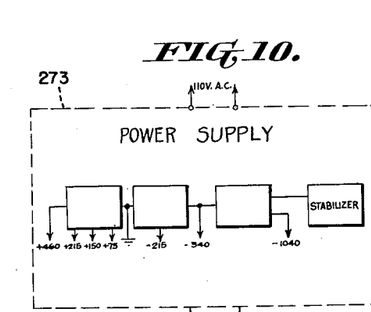
Fig. 10 is a diagram in block form of the complete electrical system of the invention exclusive of the indexing or titling circuit.

As will be more clearly apparent as the description proceeds, means is provided for calibrating the various amplifier circuits. To this end, a very stable oscillator unit, Figs. 3 and 10, is provided, which is adapted to generate a voltage of selected frequencies and of substantially sinusoidal waveform. This voltage is supplied to the input circuit of an electron discharge tube amplifier in circuit 7, which may be of conventional design, having a gain control in the input circuit, the setting of which is controlled by knob 37. An adjustable calibrating voltage is measured by meter 13, and is developed across an adjustable step attenuator having the setting thereof controlled by knob 38 having scale 39 associated therewith. The output of the attenuator may be taken from connector plug 40 labelled "External Cal.," and the output of the attenuator is also applied by internal lead connections to the amplifier channels 1, 2, 3, 4, 5, and 6, as will be hereinafter explained more fully. A binding post 41 is provided for securely grounding the circuit of channel 7 at a predetermined point therein, if desired.

Figure 9:
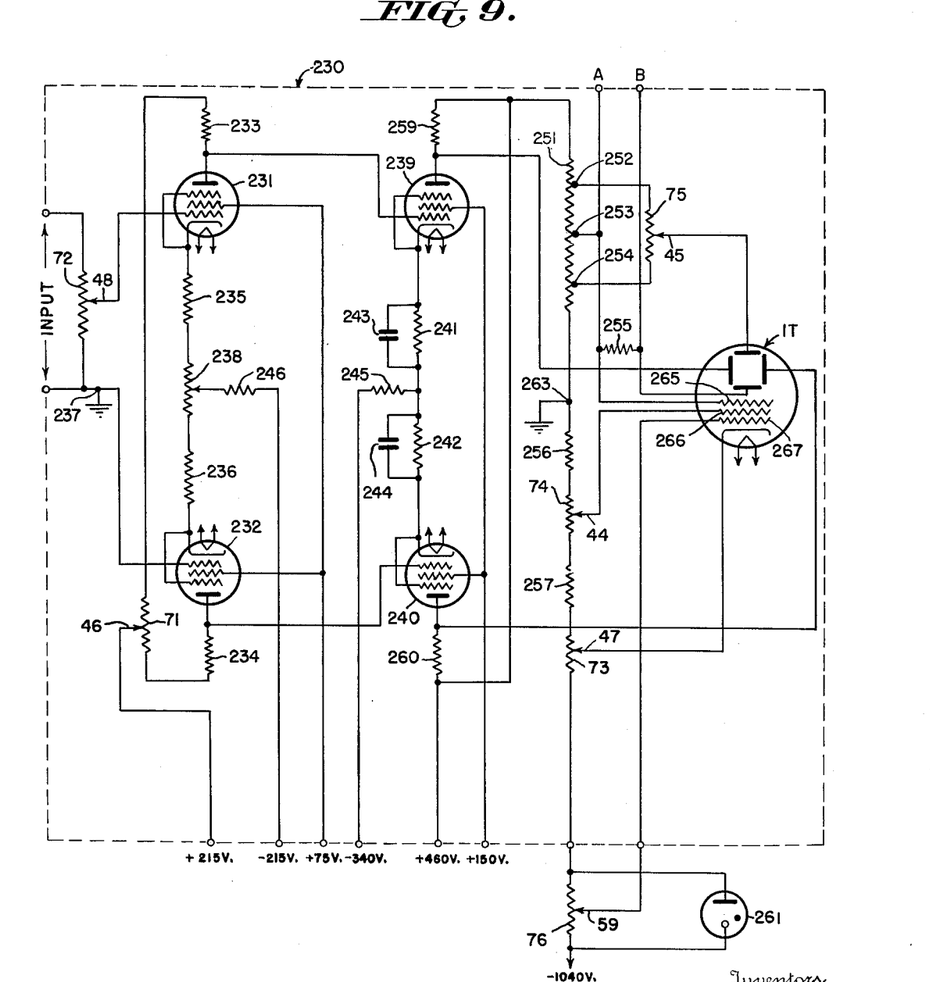
Fig. 9 is a simplified schematic electrical diagram of one of the deflection amplifier circuits employed with the cathode ray tubes.

The amplifier circuits of channels 1, 2, 3, 4, 5, and 6, which control the beam deflections of tubes 1T, 2T, 3T, 4T, 5T, and 6T, Fig. 7, respectively, may be similar, a simplified circuit diagram of one of the amplifier channels being shown in Fig. 9. The circuit of channel 1 has a focus potentiometer 74, the position of the arm of which is controlled by knob 44; a vertical position potentiometer 75, the position of the arm of which is controlled by shaft or set screw 45; a horizontal or H position potentiometer 71 the position of the arm of which is controlled by the knob 46; an individual intensity control potentiometer 73 the position of the arm of which is controlled by shaft or set-screw 47; and a gain control potentiometer 72 the position of the arm of which is controlled by knob 48. A plug 49 is provided for bringing an input signal to the amplifier of channel 1. In addition to the individual intensity control 73, the amplifier channel has associated therewith an intensity control 76 common to all the channels and which is controlled by knob 59, and which will be subsequently described more fully. The circuit of Fig. 9 will be described in detail hereinafter and need not be now traced, it being sufficient to point out here that it provides an amplifier of variable gain for one pair of deflecting plates of the cathode ray tube.

Channels 2, 3, 4, 5, and 6 may be substantially identical with channel 1, having individual focus, V-position, H-position, intensity, and gain controls, and input connectors.

The right hand channel 8, as viewed in Fig. 1, has focus control 55, V-position control 56, H-position control 57, and intensity control 58, these being of conventional design, and may be similar to the corresponding controls of channel 7. The aforementioned common intensity control, designated in Fig. 9 by the reference numeral 76, is a potentiometer having the position of the arm thereof controlled as aforementioned by knob 59.

A step attenuator, not shown, is provided in conjunction with each amplifier of channels 1, 2, 3, 4, 5, and 6. These attenuators have a common control knob 60, Fig. 1, having a scale or setting indicator associated therewith. The attenuators comprise resistance networks in the input circuits whereby the inputs to the amplifiers from the input terminals, terminal 49 of amplifier 1, for example, when switch 60 is in "Gain" position, may be attenuated times 1.0 or times 0.1. Similarly, when the switch 60 is in "Calibrate" position, a calibrating voltage is being applied to the signal amplifier channels from channel 7, and this calibrating voltage may be attenuated times 1.0 or 0.1 depending upon the position of knob 60. The knob 60, accordingly, is observed to have four positions. In each of the chassis 1C, 2C, 3C, 4C, 5C and 6C is mounted a multiple pole, four position switch, not shown, these switches being mounted in alignment when the chassis are mounted on panel 12, and the switch arms thereof being ganged, as by a long shaft common to all the switches and insertable through aligned apertures in all the chassis, all of the switch arms being controlled from knob 60.

Also mounted on panel 12 is a beam control switch 61 for purposes to be hereinafter explained, and a binding post 62 for grounding the circuit of channel 8 at a predetermined point therein, if desired. Below the main panel 12 is the aforementioned supplementary panel 32, having a number of switches and controls mounted thereon, these to be more fully explained subsequently.

The cathode ray tubs 1T through 8T inclusive provide a maximum of eight simultaneous indications. The instant invention provides that six of these are signal indications and that all may be simultaneously viewed, or simultaneously recorded on film, as will hereafter be more fully explained.

Two methods of recording on film are provided for. To this end, a camera 100 is provided, detachably mounted upon the top of the housing 10, Fig. 2, the camera having handle 101 and extended flanges 154 on either side thereof adapted to slip in the recessed portions of a pair of guideways 152 mounted on the housing 10 on either side of the camera position and maintained thereon by screws 153. The camera 100, Figs. 3 and 4, has therein a lens aperture 119 adapted when the camera 100 is mounted on the housing 10 to register with an aperture 120 in housing 10. The camera 100 further has therein a revolvable drum 103 having raised side flanges 121 and 122 and having thereon sprocket teeth 107 for engaging the sprocket holes 108, Fig. 8, in the film 105. This drum is mounted to rotate with a shaft 106 and is in a predetermined position with respect to an adjacent lens 136, which is adapted in a manner to be subsequently more fully described to focus images onto the film 105 which has its outer surface in the focal plane of the lens. A supply reel 111 journaled for rotation on shaft 113, which is mounted in the camera 100, has a pulley groove 116 formed integral therewith, and is coupled by a spring belt 115 to a take-up reel 112 having pulley groove 117 integral therewith, the reel being journaled for rotation upon shaft 114 also mounted in the camera 100.

Figure 4:
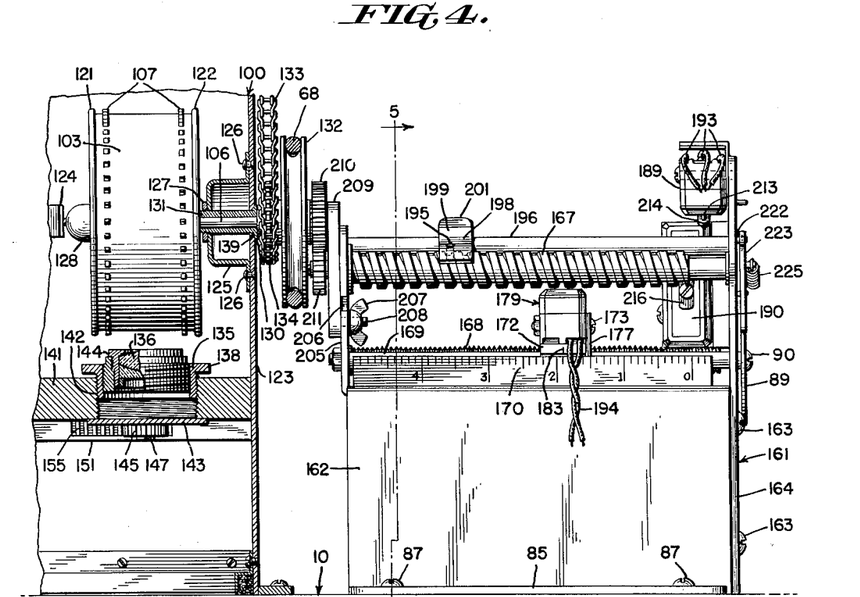
Fig. 4 is a view partly in section and partly in elevation of the film driving apparatus and mechanical timing apparatus operatively associated therewith.

The drum 103 may be adapted to have a bearing therein for shaft 106, the shaft having a suitable keyway, not shown, therein adapted to cooperate with a key, not shown, in the bearing, so that the drum may be slideably removed from the shaft, pressure of spring 124, Fig. 4, upon member 128 providing for maintaining the drum in place upon the shaft. Rotation of the drum causes movement of the film from the supply to the take-up reels, as will be readily understood by those skilled in the art.

The small housing 137 is disposed within the camera 100 for mounting the aforementioned lens 136 and the mechanism for operating a shutter 143 associated therewith. The housing 137 has a relatively heavy and solid upper portion or top 141 having a threaded bore 142 therein for receiving a lens adapter 135 which has a flange portion 138 for convenience in inserting the adapter into the aforementioned bore. The adapter has a lens barrel 144 for the lens 136 and which is adapted to be inserted into the lens bore in the adapter, thereby to provide a mounting for the lens. Focusing is accomplished by turning the lens adapter in its threaded bore 142 whereby the lens is moved closer to or farther from the film 105 as may be desired. Whereas any suitable lens may be employed, in the preferred embodiment described herein the lens is a Bausch and Lomb Baltar wide angle lens. The lens may be, if desired, provided with an iris diaphragm suitably adjustable for adjusting the speed of the lens.

Mounted upon the underside of top plate 141 are two bearing members 147 and 148 having small spur gears 145 and 146 meshing and mounted for rotation thereon respectively. Gear 145 has fixed thereto the aforementioned lens shutter 143 adapted to move with the movement of the gear 145. Gear 146 is adapted to mesh with the teeth 155 of a rack 151 which is slideably mounted on the underside of plate 141 and extends through an aperture or opening beyond the camera wall, to form a shutter operating means manually operable from outside the camera.

Film perforating means of conventional design, not shown, is mounted in the back wall of the camera to provide means for identifying the film, and for other purposes.

Reference is made now particularly to Fig. 3, on which is shown details of the apparatus by which the indications on the fluorescent screens of the cathode ray tubes are reflected through aforementioned lens 136 within lens barrel 144 on to the aforementioned film 105, or viewed by the eye of an observer at viewing hood or eyepiece 15, Fig. 1. There is provided a system of mirrors mounted within the housing 10 in predetermined positions therein, and adapted to provide paths Y and X for the light rays from the fluorescent screens to the film or eyepiece respectively.

The mirror 350, which provides for path Y, is a relatively long, flat mirror extending along the rear of housing 10, and is mounted upon a flat supporting member 353 which is in turn mounted upon brackets at each end of the housing, one of the brackets being shown at 354 and held to the base of the housing by screws 355. The mirror 350 is securely held to member 353 by suitable mounting brackets such as 352, which are fixed to member 353 as by screws 351.

Light rays originating at the fluorescent screens of cathode ray tubes 1T, 2T, 3T, 4T, 5T, 6T, 7T, and 8T are reflected by mirror 350 through aforementioned apertures 119 and 120 to the lens 136 in lens housing 135 and thence to film 105.

The aforementioned eyepiece or hood 15 is provided for viewing the fluorescent screens, is fixed to the front panel 12 by any suitable means, and is in registration with an aperture 284 in the panel. A shutter 283 is provided for closing the aperture when the eyepiece is not in use, the shutter 283 sliding in guide pieces 285 and 286 fixed to the rear of panel 12 by screws 287 and 288 respectively, Figs. 3 and 7. The shutter has a handle 17, Fig. 1, securely fixed thereto as by screws 281 and nut 282, Fig. 7, and which extends through a slot 16 in panel 12, the handle providing means manually operable for manipulating the shutter to close and open aperture 284.

The path X is provided for by mirrors 341, 321, and 332 which, in Fig. 3, sequentially reflect images of the indications appearing on the fluorescent screens to the eye of an observer disposed at the eyepiece 15. Mirror 341 is mounted upon a long, flat base member 344 which in turn is mounted upon a back wall 371 of housing 10 by brackets such as 345 fixed to the wall as by screws 346. The mirror 341 is held to its base 344 by bracket 343 suitably fixed thereon as by screws 342.

Mirror 321 has a mounting plate 322 fixed to the upper or side walls by any suitable means, not shown, and is fixed to the mounting plate by brackets such as 323 held to the plate as by screws 324.

Mirror 332 is mounted upon a suitable support 335 and fixed thereto by any convenient means not shown, the support 335 being adapted to be rotated about its longitudinal axis. Three other mirrors 331, 333, and 334 are mounted upon the support 335 with their reflecting faces disposed as shown in Fig. 3. It will be recalled that signals applied to the amplifiers of channels 1 through 8 reflect the cathode ray tube beams in only a horizontal direction or plane. It will be understood by those skilled in the art to which the invention pertains that rotation of the member 335, whereby mirrors 331, 332, 333, and 334 in rapid sequence reflect the images on the screens to the eye, provides for the production of two dimensional images to an observer stationed at eyepiece 15.

The support 335 may be rotatably mounted within the housing in any convenient manner, as by suitable bearings suspended from the walls or top of the housing. The member 335 has operatively connected to the end thereof a member 20, Figs. 1 and 2, which is adapted to be manually rotated thereby to rotate the member 335 and mirrors 331, 332, 333, and 334 fixed thereon. Preferably the support 335 has operatively connected thereto a large, solid relatively heavy member, not shown, adapted to rotate therewith and provide a flywheel effect.

Figure 2:
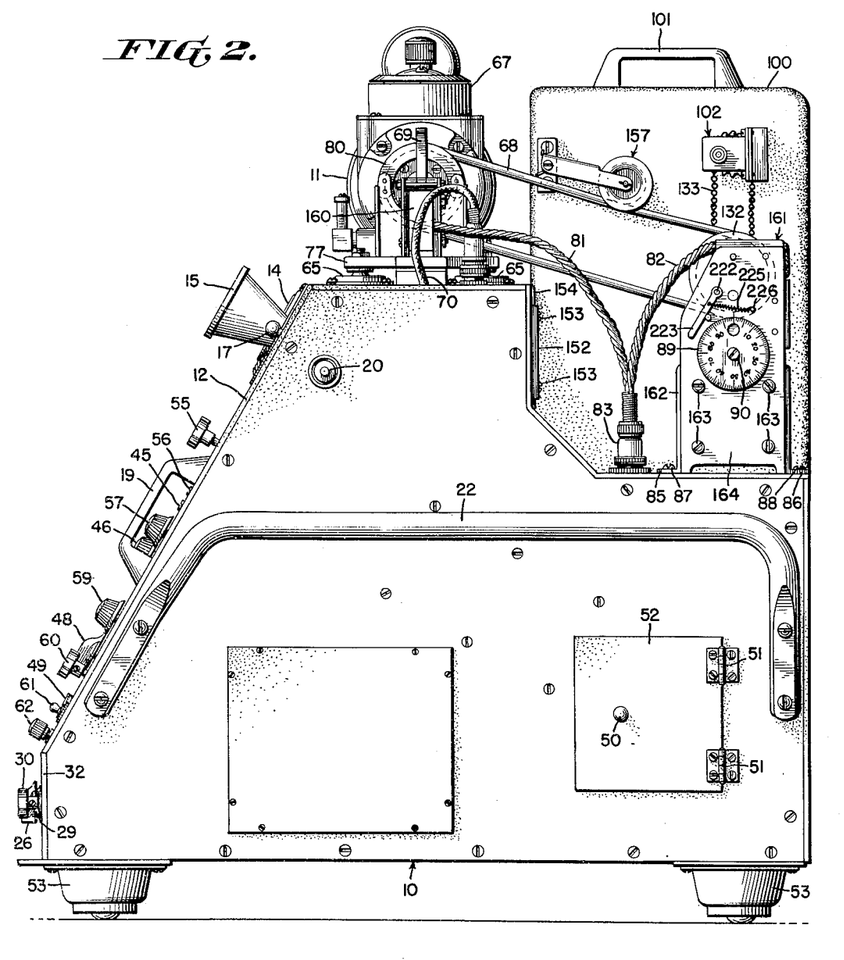
Fig. 2 is a side elevation of the housing and apparatus mounted thereon.

Referring now particularly to Fig. 4 which shows the apparatus for rotating the aforementioned drum shaft 106, the drum shaft is journaled for rotation in a bearing 131 mounted within a small housing 125 fixed to the inside of wall 123 of camera 100 by rivets 126. The bearing member 131 is adapted to be inserted through a bore 130 in the wall 123 so that the flange 139 abuts against the wall 123, and through a corresponding or registering bore in housing 125, and has a threaded end for receiving nut 127 for holding the bearing fixedly in place in the housing 125. The shaft 106 extends outside the wall 123, where it has fixed thereon a sprocket wheel 134 and an adjacent pulley 132. The sprocket wheel 134 has a chain 133 driven thereby which drives a mechanical counter of conventional design, generally designated by the reference character 102, Fig. 2, and fixed to the wall of camera 100. Pulley 132 is driven by a belt 68 from pulley 80, Fig. 1, which is driven through variable speed transmission 67 from a motor 11. Attached to the camera wall, Fig. 2, is a spring tensioned idler pulley generally designated by the reference numeral 157, for maintaining tension on belt 68. The motor 11 and variable speed transmission are mounted upon a base 77 which is mounted by shock absorbing supports, which are shown at 65, Fig. 1, upon the top of the main housing 10. The variable speed transmission may be of conventional design; in the embodiment shown, a transmission known in the trade as a Graham model 15M type A0001B is employed. A clutch having arm 95 and operating lever 69 is adapted to shift pulley 80 from a driven to an idle position, in a manner well known to those skilled in the art. The raised shoulder 93 of the base 77 has mounted therein a switch 160, Fig. 2, adapted to have its contacts selectively closed or opened depending upon whether arm 69 is thrown to a drive or idle position respectively, the switch acting under certain conditions, hereafter to be described, to center or direct the beams of all the cathode ray tubes on their fluorescent screens.

As is well known in the art, it is usually undesirable to leave the beam of a cathode ray tube focused on the fluorescent screen in unmoved position and in sufficient intensity for a considerable length of time, for the reason that the fluorescent material may be burned off. Prior art devices have usually employed electrical circuit means to decrease the intenstiy of the beam and the brilliance of the spot during those periods when no useful signal was applied to the cathode ray oscilloscope. The instant invention provides an improved arrangement in which, during periods of idleness when no signal to be recorded is applied to the scope, a high deflecting potential difference is applied between one pair of plates sufficient to deflect the beam completely off the fluorescent screen. Circuits are provided whereby when beam control selector switch 23 on panel 32, Fig. 1, is thrown to its "Clutch" position, throwing the clutch lever 69 to a drive position starts the movement of film past the aforementioned lens 136 and at the same time operates the aforementioned switch 160 in shoulder 98 which results in the movements of the cathode ray tube beams to center positions. When clutch lever 69 is moved to an idle position, the beams are deflected off of the fluorescent screens.

A solenoid 94, mounted in a bracket 97 beneath shoulder 98 is operatively connected to arm 95 and is adapted when energized to throw the clutch from an idle to a driven position. Lead connections to the solenoid 94 are brought through leads 70, Fig. 2, to suitable terminals on the terminal strip 31, Fig. 1.

The drum 103, in addition to being adapted to have a film move therearound as it moves from supply reel 111 to take-up reel 112, at a speed determined by the setting of the variable transmission 67, is also adapted, if desired, to have a length of film attached around the outer periphery thereof, the end of the film overlapping, and the film moving unbrokenly past the optical axis of the lens in the focal plane thereof. When such an arrangement is employed, it is desirable to provide automatic switching means for centering the beams during one revolution only of the drum and thereafter instantly deflecting them off of the screens, in order to insure that the traces formed on the film by images of the moving luminous spots on the fluorescent screens do not overlap and become distorted and confused on subsequent drum revolutions after the first.

To this end, a mechanical timer is provided, shown in Figs. 2 and 4 mounted upon the top of the housing 10 at the rear thereof adjacent the camera 100, and having the general designation 161. A base 162 has flanges 85 and 86 on the bottom thereof having bores for receiving screws 87 and 88 respectively for securely fixing the base to the housing 10. The right end of base 162 has a plate 165, Fig. 5, closing it and to which is fixed, as by screws 163, an upright plate 164. The left end of the base 162, Fig. 4, has fixed thereon an upright plate 205, the plates 205 and 164 providing mounts for the switch and timing mechanism, which comprises a worm shaft 167 journaled for rotation in suitable bearings in the plates, the shaft 167 having a smooth extension or uncut portion on the left end thereof, Fig. 4, on which is journaled and free to rotate thereon an arm 209, the arm 209 having a stud shaft or bearing member 221 fixed thereon for mounting a gear 210 which is free to rotate on the bearing member. Outside the arm 209 and fixed to worm shaft 167 to rotate therewith is the gear 211, adapted to mesh with gear 210. In the lower end of the arm is fixed a screw 208 adapted to pass through a cut-away 206 in plate 205 and having locking nut 207 threaded thereon, the screw and locking nut being provided for fixing the position of arm 209 with respect to plate 205. When plate 205 is mounted in the position shown in Fig. 6, gear 210 meshes with a gear 212 fixed to shaft 106 to rotate therewith. Accordingly, movement of the belt 68 and pulley 132 drives the film and also causes rotation of the worm shaft 167 through the chain of gears 212, 210, and 211. When it is desired to detach camera 100 from the housing 10, nut 207 is loosened and arm 209 swung to a position where gear 210 may be freely disengaged from gear 212.

Adjacent the worm shaft 167 are mounted two other shafts 166 and 196, with the axes of all three shafts mutually parallel. A cam or worm follower generally designated at 199 is adapted to move freely upon the shaft 166. The follower has an arm 198 having an aperture 197 therein through which the shaft 196 passes, and the arm 198 has fixed thereon a tooth 195 adapted to engage the threads in the worm shaft 167, whereby the follower 199 is moved to the right or left, Fig. 4, in response to rotation of the worm shaft. In actuality, in the operation of the apparatus, movement of the follower is always toward the right, Fig. 4, as will be explained more fully subsequently.

Figure 5:
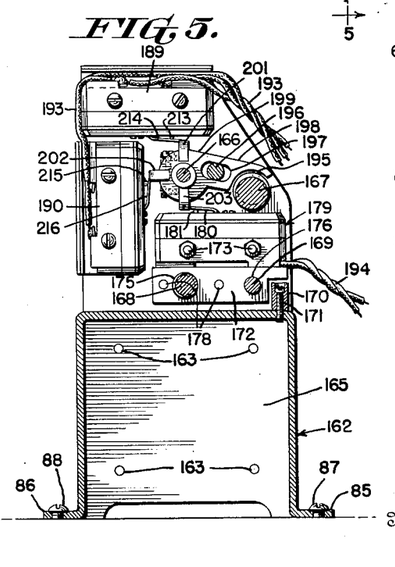
Fig. 5 is a detailed cross sectional view of the arrangement of the micro-switches and other apparatus, taken along the line 5—5 of Fig. 4.
Figure 6:
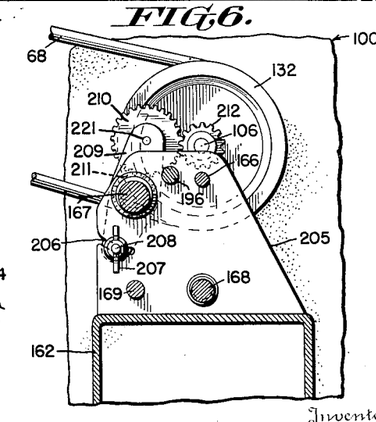
Fig. 6 is a detailed view of the gears and driving mechanism of Fig. 4.

Two additional parallel shafts 168 and 169 extend between the plates 205 and 164, these being positioned below the worm shaft, Figs. 5 and 6. Shaft 168 is threaded throughout substantially its entire length, while shaft 169 is not threaded. Mounted upon these two shafts is a metal block 172 having a threaded bore 175 therein for receiving threaded shaft 168, and a smooth bore 176 therein through which shaft 169 is adapted to movably pass. Mounted upon block 172 is a switch 179, held in position thereon by a plate 177 on the right side thereof, Fig. 4, the plate being fixed to the switch 179 by screws 173, and being fixed to the block 172 by screws 178.

The switch 179, the purpose of which will be hereinafter explained, which may be of the type known in the trade as a Microswitch, has an arm 180 mounted thereon adapted when moved downward, to depress a pin 181 which operates the switch mechanism. This arm 180 is adapted to be actuated by a stud or shoulder piece 203 carried by the worm follower, when the worm follower has moved into position about the switch. The switch 179 is adapted to be moved to the right or left, Fig. 4, by rotation of shaft 168, which has fixed on the right end thereof, Figs. 2 and 4, a dial 89 held thereto by screw 90, the dial having markings thereon for precisely positioning the switch 179, for reasons to be subsequently apparent. An indexing scale 170, Fig. 4, is mounted parallel to shafts 168 and 169 and held in place by screws, one of which is shown at 171, the mounting block 172 of switch 179 having an index mark 183 thereon which is adapted to cooperate with the markings on 170, member 170 in conjunction with dial 89 providing for precise positioning of switch 179, the 100 divisions of dial 89 corresponding to 1 small division on scale 170 in the embodiment shown and described.

Figure 12:
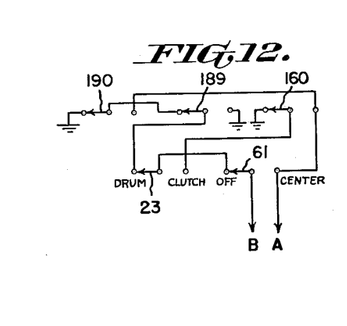
Fig. 12 is a schematic electrical diagram of the beam control circuit.

Two other switches 189 and 190 are provided, positioned at the right hand end of the mechanical timer, Fig. 4. They have arms 214 and 216 respectively, and pins 213 and 215 respectively, the arms being adapted to be operated by shoulders 201 and 202 respectively of worm follower 199, as the follower moves into positions adjacent the switch arms. As previously explained, the worm shaft 167 upon which the worm follower or cam 199 moves, is geared to rotate with shaft 196 which rotates the drum 103 upon which the film moves. The positions of switches 190 and 189 are in practice carefully chosen so that the distance between their arms is substantially that which the worm follower or cam travels along drive screw 167 during one revolution of the drum 103. These switches, when the circuits are so connected, in manners to be subsequently explained, control the centering of the cathode ray beams on the fluorescent screens of the cathode ray tubes, switch 190 when operated centering the beams, and switch 189 when operated decentering the beams. Leads 193 to switches 190 and 189 are joined by leads 194 to switch 179 to form cable 82, Fig. 2, and which connect with various parts of the electrical circuit as shown in Figs. 9, 10, and 12, the cable having connector 83 associated therewith.

The shaft 196 is eccentrically mounted, being fixed by pin 222 to a lever 223, Fig. 2, adapted when lifted to raise the shaft 196 and release the tooth 195 of the worm follower from contact with the worm. Lever 223 has a pin fixed therein having spring 225 anchored thereon, the spring being fixed at its opposite end to pin 226 fixed to plate 164, the spring acting to normally maintain the worm and worm follower in contact or operative positions.

Reference is made now to Fig. 9, which shows an aforementioned simplified schematic electrical diagram of the amplifier circuit employed with channels 1, 2, 3, 4, 5 and 6, and generally designated by the reference numeral 230. As previously stated, one of the objects of the invention is to provide multiple trace cathode ray oscilloscope equipment which is portable and has little weight. To this end, the amplifier circuit of Fig. 9 is provided, which represents an improvement over conventional deflection amplifier circuits in that high gain is secured with a limited number of electron discharge tubes, marked stability and freedom from drift are provided, and the amplifier has in the embodiment herein described a uniform response from D.-C. or zero cycles/sec. to 40,000 cycles/sec.

An aforementioned conventional input gain control potentiometer 72, has one end thereof grounded at 237 and connected to the control grid of an electron discharge tube 232, which may be a pentode known in the trade as type 6SJ7. The arm of the potentiometer is similarly connected to the control grid of another pentode 231 which may be of the type 6SJ7. The input signal is impressed across the entire potentiometer resistance. The suppressor grids of the pentodes are connected to their respective cathodes, and the cathode of tube 231 is connected to resistor 235, thence through the entire resistance of balancing potentiometer 238, thence through resistor 236 to the cathode of tube 232. The anode of tube 231 is connected to resistor 233, thence through the entire resistance of aforementioned H-control potentiometer 71, thence through resistor 234 to the anode of tube 232. The arm of potentiometer 71 is connected to the positive terminal of a source of D.-C. potential, which may be of the order of +215 volts to ground, while the arm of potentiometer 238 is connected in series with resistor 246 to the negative terminal of a source of D.-C. potential, which may be of the order of −215 volts to ground. The screen grids of tubes 231 and 232 may be connected together and to the positive terminal of a source of D.-C. potential which may be of the order of +75 volts to ground.

A second stage comprises electron discharge tubes 239 and 240, which may be pentodes of the type known in the trade as 6SH7. The control grid of tube 239 is connected to the anode of tube 231, while the control grid of tube 240 is connected to the anode of tube 232. The suppressor grids of tubes 239 and 240 are connected to their respective cathodes, and the cathode of tube 239 is connected to resistor 241 and thence to resistor 242 and thence to the cathode of tube 240. Resistors 241 and 242 have connected in parallel therewith respectively capacitors 243 and 244. The junction between resistors 241 and 242 is connected through resistor 245 to the negative terminal of a source of D.-C. potential which may be of the order of −340 volts to ground. The anode of tube 239 is connected to resistor 259 and thence to resistor 260 and thence to the anode of tube 240, and the junction between resistors 259 and 260 is connected to the positive terminal of a source of D.-C. potential, which may be of the order of +460 volts to ground. The anode of tube 239 is connected to one of the horizontal deflecting plates of cathode ray tube 1T, while the anode of tube 240 is connected to the other horizontal deflecting plate of tube 1T. The junction point between resistors 259 and 260 is connected to one end of a resistance or voltage divider 251 having points or taps 252, 253, and 254, thence to ground at 263, thence through resistor 256 thence through the entire resistance of aforementioned focus potentiometer 74 thence through resistor 257 thence through the entire resistance of aforementioned individual intensity control potentiometer 73 thence through the entire resistance of aforementioned common intensity control potentiometer 76 to the negative terminal of a source of D.-C. potential, which may be of the order of −1040 volts to ground. Across the ends of potentiometer 76 is connected a gas discharge tube 261.

The arm of individual intensity control potentiometer 73 is connected to the cathode of cathode ray tube 1T. Tube 1T may be of the type known in the trade as a 2BP11, having in addition to a filament, cathode and deflecting plates, three elements 265, 266, and 267 adapted to influence the electron stream. The arm of focus control potentiometer 74 is connected to the element 266 of tube 1T. The arm of common intensity control 76 is connected to element 267 of tube 1T. Element 265 of tube 1T is connected to point 253 on resistor 251, and is further connected through lead A to a beam position switch circuit, Fig. 12, and is also connected through resistor 255 to the lower one of the vertical deflecting plates of tube 1T. This lower one of the vertical deflecting plates is also connected to the beam position switches. Across points 252 and 254 on voltage divider 251 is connected an aforementioned V position control potentiometer 75, the arm of which is connected to the upper vertical deflection plate of cathode ray tube 1T.

The circuit of tubes 231, 232, 239, and 240 comprises a balanced D.-C. amplifier of high stability. It is noted that tubes 231 and 232 comprise a cathode coupled amplifier, in which phase inversion occurs in the cathode circuits of the tubes. The input stage also provides a balanced amplifier with single ended input; a variation in the plate voltage of the tubes does not cause a change in the output of the stage. It is further noted that the final stage provides a negative feedback arrangement to compensate for losses in high frequencies, the small cathode resistors providing negative current feedback. These resistors 241 and 242 may be of the order of 850 ohms each. They are preferably by-passed as shown by small capacitors 243 and 244 respectively, which may be of the order of 0.01 mfd. each, and which improve the frequency response of the amplifier, which, by suitable choice of component values, may be made to have a flat response from zero to 40,000 C. P. S. In the preferred embodiment herein described, the amplifier provides a voltage gain of approximately 8000.

The common intensity control 76 having control knob 59 on the front panel 12 is provided for adjusting the intensities of all the beams to desired values according to whether the equipment is idle or is being used for recording or observation purposes.

Reference is made now to Fig. 10, which shows a schematic circuit arrangement partially in block form of the electrical system of the preferred form of the invention. A regulated power supply 273 of any convenient design is provided for supplying the various operating potentials required by the various parts of the apparatus including the electron discharge tubes, motor, and lamps. This power supply is connected to the other apparatus by cables 278, and is adapted to be controlled from the front panel 32 by switch 26, which, when first turned to its "Heaters" position, turns on the heaters of the rectifier tubes of the power supply and the heaters or filaments of all tubes. In the operation of the apparatus, after a suitable time interval during which the filaments are allowed to assume operating temperatures, switch 26 is turned to its "Plates" position, where it supplies the necessary anode potentials. Pilot lamps 27 and 28 may be green and red respectively and may indicate when the switch 26 is in its "Heaters" and "Plates" positions respectively. Meter 14, Fig. 1, is connected to read the voltage across the 110 v. A.-C. line, it being desirable to operate the equipment from an A.-C. source of which the voltage varies only within predetermined limits.

The power supply 273 is designed for maximum portability and compactness, and may by suitable choice of component parts and arrangement thereof be made somewhat smaller than housing 10, Fig. 1. Switch 29 on the panel 32 is provided for turning on and off the motor 11.

As hereinbefore stated, an oscillator 271, which may be of conventional design, is provided for generating calibrating voltages and timing impulses. Three frequencies are provided for, in the embodiment shown 40, 200 and 1000 cycles per second, the frequency of oscillations being controlled in any conventional manner by switch 30 mounted on panel 32. The output of the oscillator 271 is delivered to an aforementioned variable gain amplifier, which is designated in Fig. 10 by the reference character 150, the output of which is measured by aforementioned meter 13 and applied to an aforementioned attenuator, which is indicated in Fig. 10 by the reference numeral 149, and which has its output controlled in steps by the aforementioned knob 38, Fig. 1.

Figure 8:
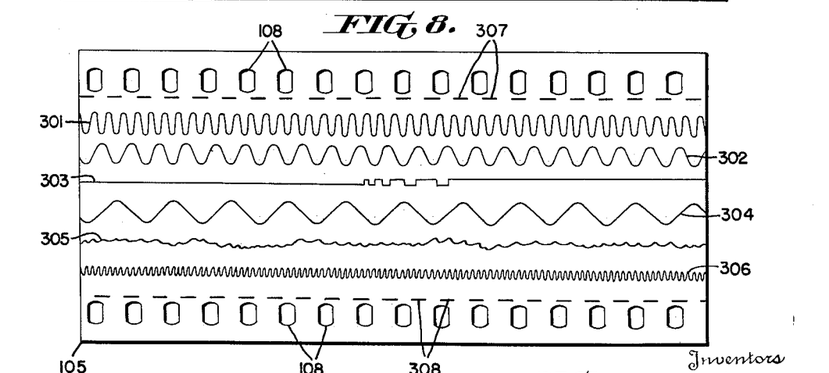
Fig. 8 is a view of a strip of film having six typical signal traces recorded thereon and in addition two timing traces.

The output of the oscillator 271, which is preferably of sine wave shape, is applied to a clipper circuit 272 which may be of conventional design, where square waves are generated and simultaneously applied in phase opposition to the amplifiers of timing channels 7 and 8, where they provide markings on the film 105 corresponding to traces 307 and 308 thereon, Fig. 8, the lengths of the markings increasing for a given film speed as the frequency of oscillator 271 is decreased.

Referring again particularly to Fig. 10, the six signal amplifier channels 1, 2, 3, 4, 5, and 6 are shown, each comprising a cathode ray tube, an aforementioned amplifier 230 having gain control 48 comprising potentiometer 72 of Fig. 9, and an aforedescribed variable attenuator operated from knob 60 of Fig. 1, which permits the input to all the amplifiers to be controlled by a common control, whether the amplifiers are receiving signal voltages or calibrating voltages, the intensity of all of the beams being controlled from aforementioned common intensity control 76.

The calibration circuit described hereinbefore is employed for calibration of the channels. Assume, by way of example, that it is desired to employ one channel to record variations in a signal of relatively large amplitude, whereas it is desired to employ another channel to record variations in a signal of small amplitude. The individual gain controls of the amplifiers, in conjunction with the aforementioned step attenuators, permit production of traces on the film 105 which have relative scale values which are known with respect to each other, in a manner well known to those skilled in the art to which the invention pertains. The use of the calibrating voltage also permits ascertaining by comparison methods the amplitude of a signal of unknown amplitude, as will readily be understood.

The switching circuit for centering and decentering the beams may now be fully traced, and comprises the clutch operated switch 160, switches 189 and 190 of the mechanical timer, beam control switch 61, and beam control selector switch 23, all of which are interconnected in the circuit of Fig. 10, details of the connections being shown in Figs. 9 and 12. The operation of these switches is as follows: The beams may be centered at any time by throwing switch 61 to its "Center" position, and this switch is used to center the beams while adjusting or calibrating the apparatus. When switch 61 is thrown in its "Off" position, it connects lead B, Figs. 9 and 12, to the arm of clutch-drum selector, switch 23. When beam control selector switch 23 is in its "Clutch" position, clutch switch 160 centers or decenters the beams selectively in accordance with whether the clutch is in a drive or idle position; when beam control selector switch 23 is in "Drum" position, the beams are centered upon the operation of switch 190, and decentered by the operation of switch 189. Switches 190 and 189 are normally in the positions shown in Fig. 12. When actuated in response to the movement of the aforementioned cam or worm follower 188, they are thrown to their other positions respectively during the period in which the cam is in contact with the respective arms 216 and 214. It is noted that there is a time interval during which switch 190 is closed to the right, Fig. 12, and switch 189 is simultaneously closed to the left, Fig. 12. Clutch switch 160 is shown connected by leads 81, Fig. 2, to the remainder of the electrical circuit.

An aforementioned switch 179 included in the mechanical timer is provided for initiating an occurrence which provides a signal to be recorded and measured. In Fig. 10, the switch 179 is connected by lead 398 to control an energy or signal source 400, for example, an explosive charge disposed within a body of water. Energy receivers 399 for generating electrical signals proportional to the pressure of the wave generated by the source 400, are disposed at spaced positions within the water and connected to the inputs of the amplifier channels 1 to 6 inclusive to provide displacements of the spots of the fluorescent screens of the cathode ray tubes proportional to the pressures received at 399. The position of switch 179 is adjusted by the aforementioned screw means whereby the explosion takes place an interval of time before the beams are centered on the screens by switch 196 which is substantially equal to the time required for the energy generated at 400 to travel through the water medium to the nearest 399.

Reference is made now to Fig. 8, which shows a section of film 195 having eight traces thereon, the signal traces designated 301, 302, 303, 304, 305, and 306 being supplied by cathode ray tubes 1T, 2T, 3T, 4T, 5T, and 6T respectively. These traces are of course intended to be typical of those which might be obtained in any application for which the apparatus is intended. Timing traces 307 and 308 are supplied by cathode ray tubes 7T and 8T respectively. It is noted that the heavy line portions of the timing traces, which are parallel to the line of movement of the film, are exactly displaced with respect to each other, a condition provided for by supplying the same timing pulse in phase opposition to the deflection control amplifiers of the two timing channel cathode ray tubes.

It will be recalled that means is provided for titling the indications recorded on the film. Referring now particularly to Fig. 3, an inner housing comprising walls 382 and 383 is provided, which extends across the interior of the main housing 10, the inner housing being preferably divided by suitable partitions therein into eight separate compartments, one for each of the cathode ray tubes 1T–8T inclusive, the housing having flanges 381 on the ends thereof for fixing the interior housing to the side walls of the main housing 10, as by screws 380. The interior housing has the walls thereof curved to form clip or attaching members 384 and 385, which are adapted to receive the edges of a suitable indexing or titling card, shown in dotted line and designated by the reference numeral 386, the card bearing any desired characters thereon, the characters being disposed on that side of the card facing the mirror 350.

The interior of the housing 10 is adapted to be illuminated only by a lamp or lamps 375 mounted upon the rear wall 371 of housing 10, it being contemplated that all the tubes of the amplifiers and of the oscillator unit of Fig. 3 will be of the metal type in which no light reaches the outside thereof. Lamp 375 is mounted within a socket 373 having lead wires 374 connected thereto, the socket being mounted upon a base plate 372 which is fixed to a mounting bracket 376 by screw 369, the bracket 376 also serving to shield the lens from direct illumination of the lamp, the base plate 372 being also attached to the back wall 371 of housing 10 by suitable means such as screws 370. Two lamps similarly mounted may be employed near the sides of the housing, if desired. When lamp 375 is lit, the card disposed between clips 384 and 385 is thereby illuminated, and the characters thereon reflected by mirror 350 into lens 136.

It is understood that card 300 is inserted before or after the useful signal traces appear on the cathode ray tubes and is removed during the occurrence of the signals to prevent the card from obscuring the screens of the tubes.

Figure 11:
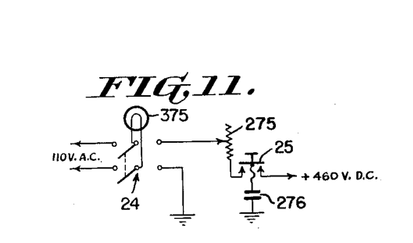
Fig. 11 is a schematic electrical diagram of the indexing circuit.

Reference is made now to Fig. 11, in which is shown the electrical circuit for lamp 375. A double pole, double throw switch 24, mounted upon panel 32, Fig. 1, when closed to the left, Fig. 11, or in its up position, Fig. 1, connects lamp 375 continuously to a suitable source of potential, such as 110 v., A. C., so that the lamp is continuously energized. When the switch 24 is thrown to the right, Fig. 11, lamp 375 is connected to a circuit whereby the lamp is adapted to be energized by the charge from capacitor 276. The push button type single pole, double throw switch 25 is adapted, when not depressed, to continuously connect the capacitor 276 to a suitable source of D.-C. charging potential, such as 460 v., D. C., which may conveniently be obtained from the aforementioned power supply 272. When switch 25 is depressed, if switch 24 is closed to the right, Fig. 11, capacitor 276 is connected through resistor 275 to lamp 375, and causes the lamp to light for a sufficient interval to illuminate the aforementioned indexing card whereby images of the characters thereon are recorded on the aforementioned film.

A door 52, Fig. 2, having handle 50, is mounted upon the side wall of housing 10 by hinges 51, and is provided for inserting indexing cards into the aforementioned card holder, the door 52 being closely fitting and preventing any substantial amount of light reaching the interior of housing 10 from sources external thereto. It is understood also that in the operation of the apparatus knob 17 is moved in slot 15 so that the shutter 283, Fig. 7, is moved to a position which closes aperture 284, thereby preventing light from entering housing 10 from this source. The apparatus which embodies the invention has now been described, and the operation and use thereof may now be summarized. As aforementioned, the camera apparatus is adapted to record traces of signals having a substantial duration, in which case film is employed which moves at a desired rate from the aforementioned supply reel to the aforementioned take-up reel; and the camera is also adapted to record traces of signals of brief duration, in which application a strip of film is attached to the drum and moved in unbroken sequence in the focal plane of the lens, the duration of the traces being limited by automatic switching means to the time required for one revolution of the drum, or less.

The first manner of operation mentioned above will be described first. Assume, by way of description, that it is desired to study the effects of shock or vibration upon the operation of a piece of electronic apparatus. The inputs of three of the amplifiers may be connected at 49 to provide traces which give a measure of the amplitude of vibration in three dimensions. The inputs of the remaining three of the amplifiers may be connected at 49 to three of the circuits of the electronic apparatus to provide traces which give a measure of irregularities in the signals in the circuits resulting from the vibration or shock, etc.

In warming up and adjusting the apparatus prior to the application of the signals to be measured, the apparatus is turned on by main switch 26 and the elements thereof allowed to assume operating temperatures. With no calibrating or useful signals applied, and with beam switch 61 thrown to a position to center the beams of all the cathode ray tubes, the beams are adjusted by aforementioned vertical and horizontal controls to be properly positioned, and by aforementioned focus and individual intensity controls for proper visibility. Switch 60 is then moved to a position and knobs 33 and 37 adjusted to positions whereby a calibrating signal of desired amplitude is applied to the signal channels from channel 7, and the gains of the amplifiers of channels 1—6 adjusted. Switch 61 is then thrown to its "Off" position, and switch 60 is thrown to one of its "Gain" positions. The camera is loaded properly. Switch 30 is adjusted to give timing traces of desired length on the film. The motor 11 is then started, and the variable speed transmission adjusted to the position which will drive the film at the desired speed. Beam control selector switch 23 is thrown to its "Clutch" position. The apparatus to be studied is then set in operation and subjected to vibration. The clutch lever is then thrown to its operating position, which starts the movement of film past the lens and through aforementioned switching circuits including switch 169 causes the beams of the cathode ray tubes to be directed onto the fluorescent screens thereof, with the result that traces are recorded on the film. After a desired time interval has elapsed, the clutch lever is thrown to its idle position, which stops the movement of the film, and decenters the beams. The film may then be titled if desired, by the use of aforementioned titling apparatus, or the film may be titled to the recording of the signals, if desired.

In the second mode of operation of the device, the mechanical timer is employed. The beams and amplifiers are adjusted in manners heretofore described. The switch 23 is thrown to its "Drum" position. A strip of film is attached to the drum 103, and held thereon by any suitable means, for example, transparent adhesive tape. Switch 179 is connected to the source of the signal or signals to be recorded. The apparatus is then set in operation. The camera drum is set in rotation by throwing the clutch lever to operate position. Switch 179 initiates the signal to be recorded, and after a time interval has elapsed, the length of which is determined by the position of switch 179 as adjusted by aforementioned setting means including shaft 168 and dial 89, switches 199 and 189 are operated and sequentially act to direct the beams onto the fluorescent screens during one revolution of the drum and thereafter decenter the beams, during which revolution the signals to be recorded and measured are applied to the inputs of the respective amplifier channels, it being assumed that the time interval to which the mechanical timer is set corresponds to the time required for generation of the signals to be recorded. It is of course understood that the signal initiation circuit of switch 179 may be dispensed with if desired in the study of signals of brief duration, the remainder of the mechanical timer being used in its normal fashion.

Whereas the invention has been shown and described with reference to a preferred embodiment thereof which gives satisfactory results, it will be understood by those skilled in the art to which the invention pertains, after understanding the invention, that various changes and modifications may be made without departing from the spirit and scope of the invention, and it is intended, therefore, in the appended claims to include all such changes and modifications.

This invention may be manufactured and used by or for the Government of the United States of America for governmental purposes without the payment of any royalties thereon or therefor.

What is claimed as new and desired to be secured by Letters Patent of the United States is:

1. In cathode ray multi-signal measuring and recording apparatus of the character disclosed, a plurality of cathode ray tubes having orthogonal-axes deflection systems individual thereto, said deflection systems being adapted to deflect the electron beams of the tubes along one axis thereof in response to a plurality of signals respectively applied thereto, circuit means common to said deflecting systems and including a pair of switches arranged in spaced relation and operable for directing the electron beams onto the fluorescent screens of the tubes or deflecting said beams off of said screens along the other axis of the deflecting systems selectively in accordance with the actuation of said pair of switches, a rotatable drum having a sensitive film mounted thereon around the outer periphery thereof, said drum being mounted upon a rotatable shaft, means for rotating said shaft, means for simultaneously focusing onto said film spaced colinear images of the fluorescent traces of said beams normal to the tangential direction of motion of said film, a worm shaft geared to the rotatable shaft and adapted to rotate therewith, said worm shaft being disposed in predetermined position with respect to said pair of switches, and a worm follower for said worm shaft adapted to actuate said pair of switches in predetermined sequence as it moves along the worm shaft, the distance between said switches being such that said beams are centered on the fluorescent screens during one revolution only of said drum.

2. In a cathode ray multi-signal measuring and recording apparatus of the character disclosed, in combination; a plurality of cathode-ray tube means adapted to simultaneously produce a plurality of linear indications corresponding to variations in a plurality of quantities; a normally open switching circuit connected to said cathode-ray tube means and adapted when closed to render all said cathode-ray tube means operable to produce said indications; a rotatable shaft; a moveable drum fixed to said shaft for rotation therewith and adapted to have a sensitive film fixed thereon around the outer periphery thereof; means for focusing into spaced colinear positions on the periphery of said drum and normal to the peripheral center line thereof images of all said indications; means for driving said shaft; and means for closing and opening said switching circuit in predetermined sequence thereby to render said cathode ray tube means operable for a predetermined period of time, said last named means including a worm shaft, gear means operatively connecting said worm shaft to said rotatable shaft whereby the shafts are rotated together at speeds having a predetermined ratio, a worm follower operating with said worm shaft, and a pair of switches connected in said switching circuit and positioned in predetermined spaced relation to said worm shaft, said switches being adapted to be sequentially operated by said worm follower as it moves in response to the rotation of said worm shaft to close and thereafter open said circuit.

3. In cathode-ray multi-signal measuring and recording apparatus of the character disclosed having a plurality of cathode-ray tubes each having a fluorescent screen, in combination; a housing having first and second apertures therein; a camera having a lens, means for moving a sensitive film past the lens in the focal plane thereof at a uniform rate of speed; said camera being adapted to be detachably mounted upon said housing with the lens adjacent said first aperture; a first mirror disposed within said housing in predetermined position with respect to said cathode-ray tubes and said first aperture and adapted to reflect images of the indications of all the fluorescent screens into said lens when said camera is mounted on the housing; second and third mirrors mounted in said housing in fixed spaced positions therein; a rotatable multi-faced mirror mounted in said housing adjacent said second aperture; in the optical path of the second and third mirrors whereby they are adapted to reflect images of the indications appearing on all the screens of said cathode-ray tubes upon said rotatable mirror thereby to provide multi-dimensional indications of all traces when viewed from said second aperture; manually operable means external to said housing and connected to said rotatable mirror for rotating the mirror at will thereby providing two-dimensional images of the indications on the cathode ray screens; and adjustable cover means for selectively closing said second aperture.

4. In cathode-ray multi-signal measuring and recording apparatus of the character disclosed, in combination, a housing having an aperture therein, a plurality of cathode-ray tubes mounted in a row within said housing; a plurality of deflection amplifiers for said cathode-ray tubes respectively whereby a plurality of simultaneous colinear indications may be obtained on the fluorescent screens thereof; a camera having a length of film, film transporting means, and a lens, said transporting means including supply and take-up reels for said film, a rotatable drum adapted to have said film move around the outer peripheral surface thereof from said supply to said take-up reel when said drum is rotated, and a rotatable shaft fixed to said drum for rotating the drum; a first pulley fixed to said shaft external to the camera, the camera being mounted upon said housing with the lens adjacent said aperture and for film motion normal to the colinear images of said indications, mirror means mounted within said housing for reflecting images of all said indications into said lens when said camera is mounted on said housing; a motor mounted upon said housing; said motor having a variable speed transmission, a driving pulley, and clutch mechanism adapted to shift said driving pulley from an idle to a driven condition selectively in accordance with the operation of the clutch; a belt connecting said driving pulley and said first pulley for driving said shaft and drum; and means including a switch operatively connected mechanically to said clutch and electrically to said cathode-ray tubes for rendering said tubes inoperable to supply indications for said film except when said clutch is in an engaged position whereby said driving pulley rotates said drum.

5. In cathode-ray multi-signal measuring and recording apparatus of the character disclosed, having eight cathode-ray tubes, said cathode-ray tubes being disposed in a row at substantially equally spaced intervals and with their fluorescent screens lying in the same plane, in combination, eight deflection control amplifiers for said cathode-ray tubes respectively, said deflection amplifiers all being adapted when energized to cause colinear beam deflections in said plane in accordance with signals applied thereto, means for continuously generating a variable frequency timing voltage having a substantially square waveform, means for applying said voltage in phase opposition to the amplifiers associated with the outer two of said cathode-ray tubes, a camera having a supply of sensitive film therein, means including a lens for focusing onto said film in predetermined spaced positions thereon colinear images of the indications on the fluorescent screens of all the cathode-ray tubes, means for moving said film past said lens in the focal plane thereof at a substantially uniform rate of speed to produce signal measuring and timing traces thereon of said images, means for simultaneously centering a plurality of normally off centered beams and initiating operation of said film moving means, means for deflecting said beams during predetermined limited operation of said film moving means, the movement of said film providing a time base for the indication images recorded thereon, and a plurality of means associated with the amplifiers of the other six cathode-ray tubes for adjusting the individual gains thereof to conditions where given transverse distances on said film represent predetermined signal voltages applied to said amplifiers, said timing traces supplying reference means for ascertaining the common time base of the recorded images as supplied by the movement of said film.

6. The method of recording from a plurality of cathode ray tubes beam deflections, said deflections corresponding to simultaneous variations in a plurality of signals on a moving sensitive film as a function of time comprising the steps of perforating the film while stationary for identification, initiating motion of said film and simultaneously applying potentials to the plates of said cathode ray tubes for deflecting said beams in register with said film during predetermined limited motion thereof, applying said signals to said tubes for recording on said film, thereafter deflecting said beams out of register with said film and simultaneously ceasing motion of said film upon termination of recording whereby mutually spaced images of deflections corresponding to said signal variations are recorded colinearly and normal to the direction of motion of said film.

References Cited in the file of this patent

UNITED STATES PATENTS

| Number | Name | Date |
|---|---|---|
| 1,736,456 | Matthias | Nov. 19, 1929 |
| 1,893,337 | Patterson | Jan. 3, 1933 |
| 1,958,897 | Leyland | May 15, 1934 |
| 2,186,268 | Pakala | Jan. 9, 1940 |
| 2,241,432 | Von Ardeene et al. | May 13, 1941 |
| 2,251,786 | Epstein | Aug. 5, 1941 |
| 2,301,199 | Bruce et al. | Nov. 10, 1942 |
| 2,425,003 | Potter | Aug. 5, 1947 |
| 2,440,538 | Chalberg | Apr. 27, 1948 |
| 2,455,456 | Whittaker | Dec. 7, 1948 |
| 2,489,253 | Andre | Nov. 29, 1949 |
| 2,561,612 | Culver | July 24, 1951 |